United States Patent
Yulo

(10) Patent No.: US 8,146,101 B2
(45) Date of Patent: Mar. 27, 2012

(54) METHOD OF PROCESSING NOTIFICATIONS PROVIDED BY A ROUTINE, AND ASSOCIATED HANDHELD ELECTRONIC DEVICE

(75) Inventor: Alvin Yulo, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 942 days.

(21) Appl. No.: 11/414,710

(22) Filed: Apr. 28, 2006

(65) Prior Publication Data

US 2008/0005117 A1    Jan. 3, 2008

(51) Int. Cl.
   G06F 3/00   (2006.01)
   G06F 9/44   (2006.01)
   G06F 9/46   (2006.01)
   G06F 13/00  (2006.01)

(52) U.S. Cl. ........................................ 719/318

(58) Field of Classification Search .............. 707/10, 707/203; 719/318
   See application file for complete search history.

(56) References Cited

U.S. PATENT DOCUMENTS

| 5,196,856 | A  | * | 3/1993  | Litchford et al. ............. 342/455 |
| 5,379,340 | A  |   | 1/1995  | Overend et al. |
| 6,084,739 | A  | * | 7/2000  | Assouad .................... 360/77.08 |
| 6,367,034 | B1 | * | 4/2002  | Novik et al. .................... 714/39 |
| 6,438,618 | B1 |   | 8/2002  | Lortz et al. |
| 6,856,993 | B1 |   | 2/2005  | Verma et al. |
| 6,941,557 | B1 |   | 9/2005  | Jakobson et al. |
| 7,213,040 | B1 | * | 5/2007  | Stokes et ..................... 707/203 |
| 7,391,784 | B1 | * | 6/2008  | Renkel .......................... 370/401 |
| 7,644,149 | B2 |   | 1/2010  | Van Geest et al. |
| 2002/0194382 | A1 | * | 12/2002 | Kausik et al. ................ 709/246 |
| 2004/0172454 | A1 |   | 9/2004  | Appelman et al. |
| 2006/0166651 | A1 | * | 7/2006  | Kim .......................... 455/412.1 |
| 2007/0276887 | A1 |   | 11/2007 | Geest et al. |

OTHER PUBLICATIONS

Vaarandi R., "SEC—a Lightweight Event Correlation Tool", IP Operations and Management, 2002 IEEE Workshop on Oct. 29-31, 2002, Piscataway, NJ. USA, IEEE, Oct. 29, 2002, pp. 111-115, XP010611957, ISBN: 978-0-7803-7658-8.

* cited by examiner

*Primary Examiner* — Andy Ho
*Assistant Examiner* — Timothy A. Mudrick

(57) ABSTRACT

An improved handheld electronic device includes an Application Programming Interface (API) that generates various notifications in certain circumstances. Certain predetermined criteria that have been established for a particular routine on the handheld electronic device are employed to ignore certain of the notifications in appropriate circumstances in order to conserve computing and power resources.

33 Claims, 3 Drawing Sheets

METHOD OF PROCESSING NOTIFICATIONS PROVIDED BY A ROUTINE, AND ASSOCIATED HANDHELD ELECTRONIC DEVICE

BACKGROUND

1. Technical Field

The disclosed and claimed concept relates generally to handheld electronic devices and, more particularly, to a method of managing notifications provided by an Application Programming Interface (API) on a handheld electronic device.

2. Description of the Related Art

Numerous types of handheld electronic devices are known. Examples of handheld electronic devices include, for instance, personal data assistants (PDAs), handheld computers, two-way pagers, cellular telephones, and the like. Many handheld electronic devices also feature a wireless communication capability, although many such handheld electronic devices are stand-alone devices that are functional without communication with other devices.

Some handheld electronic devices that are sold with certain software resident thereon and are configured to allow additional software developed by third parties to be installed and executed on the electronic handheld device. In order to facilitate the use of such third-party software, the manufacturer of the device may sell the device with original software that is sufficiently versatile to enable cooperation between the original software and third-party software. Such third-party software may be provided on the device when originally provided to a consumer, or may be added after purchase. While such handheld electronic devices and software have been generally effective for their intended purposes, such handheld electronic devices have not been without limitation.

For instance, the original software provided by a manufacturer may be configured to be so versatile as to be somewhat burdensome to use. For example, the original software may provide a routine such as an Application Programming Interface (API) that third-party software can employ to receive notifications in response to certain events on the handheld electronic device. Due to the intended versatility of the original software, the original software may provide many more notifications than are needed or are usable by the third-party software. The processing of so many unnecessary notifications undesirably adds processing overhead and consumes both processing and power resources. Moreover, despite their versatility, such APIs may still provide fewer than all of the functions that might be desirable for use with certain third-party software. For instance, the API may provide certain notifications, but such notifications may provide less than all of the data that would be desirable for proper operation of the third-party software.

BRIEF DESCRIPTION OF THE DRAWINGS

A further understanding of the disclosed and claimed concept can be obtained from the following Description when read in conjunction with the accompanying drawings in which:

Similar numerals refer to similar parts throughout the specification.

DESCRIPTION

Figure 1:
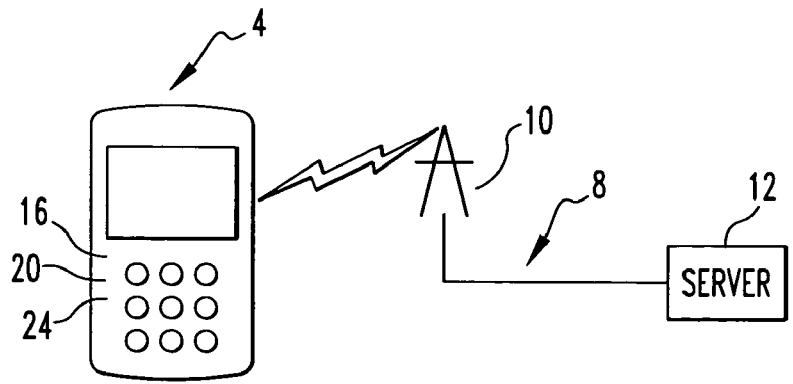
FIG. 1 is a schematic depiction of an improved handheld electronic device in accordance with the disclosed and claimed concept in communication with a network.

An improved handheld electronic device 4 is depicted schematically in FIG. 1 as being in communication with a network 8. The exemplary network 8 enables communication between it and the handheld electronic device 4 via an antenna 10 that is connected through the network 8 with a server 12. The exemplary network 8 communicates wirelessly with the handheld electronic device 4, although it is understood that the network 8 could have a wired connection with the handheld electronic device 4 without departing from the present concept.

The exemplary handheld electronic device 4 comprises an input apparatus 16, a processor apparatus 20, and an output apparatus 24. The processor apparatus 20 is configured to process input received from the input apparatus 16 and to provide output to the output apparatus 24.

The processor apparatus 20 comprises a processor and a memory 28. While not expressly depicted herein, it is understood that the processor could be any of a wide variety of processors, such as a microprocessor (μP) that is responsive to input from the input apparatus 16, that provides output to the output apparatus 24, and that interfaces with the memory 28.

Figure 2:
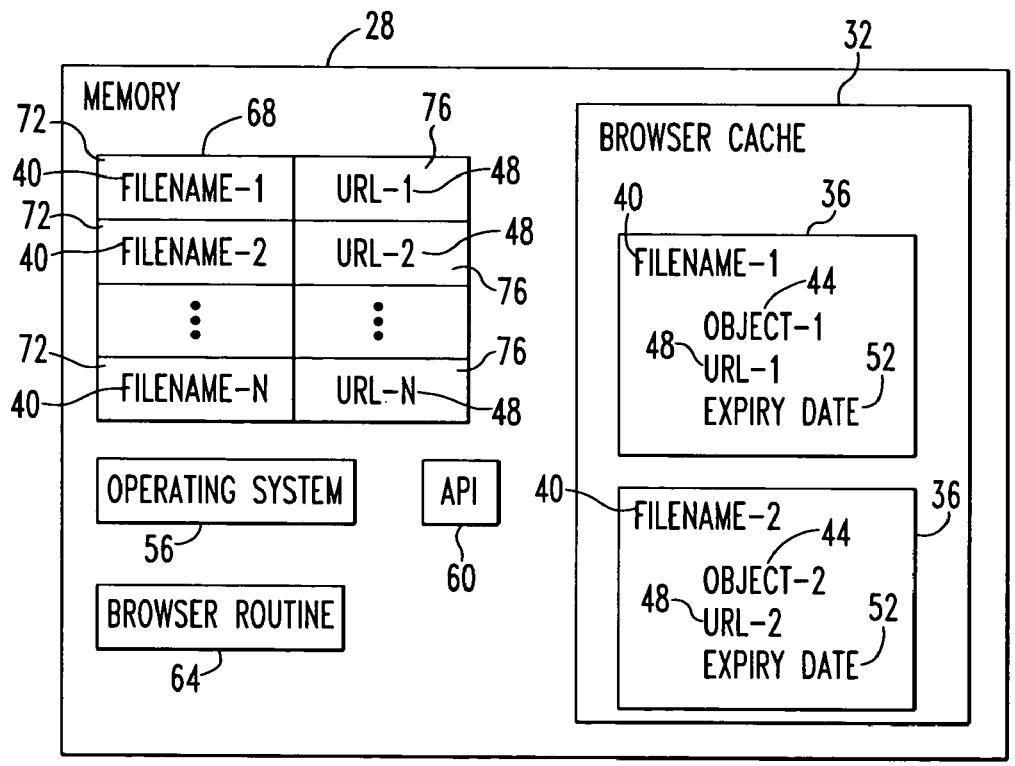
FIG. 2 is a schematic depiction of a portion of a memory on the handheld electronic device of FIG. 1.

The memory 28 is depicted schematically in FIG. 2. The memory 28 can be any of a variety of types of internal and/or external storage media such as, without limitation, RAM, ROM, EPROM(s), EEPROM(s), and the like that provide a storage register for data such as in the fashion of an internal storage area of a computer, and can be volatile memory or nonvolatile memory. The memory 28 additionally includes a number of routines stored therein that are executable on the processor, as will be set forth below in greater detail. As employed herein the expression "a number of" and variations thereof shall refer broadly to any nonzero quantity, including a quantity of one. The routines can be in any of a variety of forms such as, without limitation, software, firmware, and the like.

The memory 28 comprises a browser cache 32 having a number of files 36 stored therein within a directory structure. Each file 36 in the browser cache 32 has a file name 40 and has stored therein, for example, an object 44, a location from where the object 44 was obtained, such as a Uniform Resource Locator (URL) 48, and an expiry date 52 for the object 44. Additional relevant information may be stored in each file without departing from the present concept.

The memory 28 additionally has stored therein an operating system 56, an API 60, and a browser routine 64, among other routines as mentioned above. As is understood in the relevant art, the browser routine 64 is operable to obtain and process various items such as HyperText Markup Language (HTML) documents. A given HTML document may comprise, for example, text, and may additionally comprise descriptions of locations where additional objects may be obtained and which are to be inserted into the text. Exemplary objects that are insertable into text would include images, executable code such as JavaScript, and other objects. If an HTML document that is being processed by the browser routine 64 comprises one or more locations, the objects stored at such locations must be obtained in one fashion or another for inclusion in the output that results from the such processing of the HTML document. The locations may, for example, be URLs on a network such as the Internet.

In order to reduce communication bandwidth, such as a bandwidth of the wireless communication enabled between the handheld electronic device 4 and the network 8, certain of the needed objects may be stored, i.e., saved, in the browser cache 32 as objects 44 stored within the files 36. For example, if an HTML document being processed by the browser routine 64 comprises a location such as a URL 48 in one of the files 36, and if the expiry date 52 of the object 44 in the file 36 has not been exceeded, the object 44 stored in the file 36 is retrieved from within the browser cache 32 and is provided to the browser routine 64 for inclusion in the HTML document. In such a fashion, the amount of communication traffic between handheld electronic device 4 and the network 8 can be reduced.

One exemplary implementation of such a browser cache 32 on the handheld electronic device 4 would additionally include storing on the server 12 or otherwise making available to the server 12 a mirror of the browser cache 32. For example, if the network 8 receives a request from the browser routine 64 for a particular HTML document that may be obtainable from the network 8, the server 12 may analyze the obtained HTML document and determine whether or not it includes one or more URLs from which may be obtained objects that should be included in the HTML document. The server 12 may determine from its mirror of the browser cache 32 whether or not the object which is available at a given URL might already be stored in the browser cache 32. If the object is not already stored in the browser cache 32, the server 12 will request the object from the URL and will send the object to the handheld electronic device 4, typically in conjunction with the sending of the HTML document from the server 12 to the handheld electronic device 4. On the other hand, if the object from the indicated URL is already available in an unexpired condition in the browser cache 32, the object is not at that time requested from the URL. In accordance with the disclosed and claimed concept, the mirror of the browser cache 32 is advantageously updated whenever the browser cache 32 changes.

Whenever a browser session is initiated, a data table 68, such as is depicted generally in FIG. 2, is generated and is stored in the memory 28. The data table 68 includes a number of first objects 72 and a number of second objects 76 stored therein. Each first object 72 comprises a file name 40, which is the file name 40 of a file 36 in the browser cache 32. Each first object 72 has associated therewith a second object 76 that comprises the location, i.e., the URL 48 in the present example, of the same file 36. In the depicted exemplary implementation, the file names 40 are each stored in the first objects 72 as a hash of the file name 40 in order to reduce storage requirements and to facilitate processing.

After the data table 68 has been created, a hash of each URL 48 in the second objects 76 is provided to the server 12 to create on the server 12 the mirror of the browser cache 32. It may additionally be desirable to provide, in conjunction with each hash of a URL 48, the expiry date 52 of the object 44 that was obtained from the same URL 48, as is stored in one of the files 36.

Whenever the contents of the browser cache 32 undergo a change, the change is advantageously communicated to the server 12 so that the mirror on the server 12 of the browser cache 32 can be updated in order to enable the mirror of the browser cache 32 to accurately reflect the contents of the browser cache 32 on the handheld electronic device 4. In response to a change in the browser cache 32, the API 60 is configured to provide to the browser routine 64 the name of the file 36 in the browser cache 32 that has undergone the change. The API 60 also provides a notification of the type of change undergone by the file 36 of which the file name 40 has just been provided. The various notifications include a CREATE notification, an UPDATE notification, a DELETE notification, and a RENAME notification indicating that a particular file has been created, updated, deleted, or renamed, respectively. In the case of a RENAME notification, typically two file names 40 are provided, i.e., the initial file name 40 of the file 36, as well as a new name for the same file 36.

It is noted, however, that merely providing the file name 40 of the file 36 that has undergone a change does not itself provide the URL 48 of the same file 36, and such URL 48 cannot be obtained directly from the operating system 56 or the API 60. The browser routine 64 is advantageously configured to obtain in other fashions the particular URL 48 of the file 36 in the browser cache 32 that has undergone the change.

Figure 3:
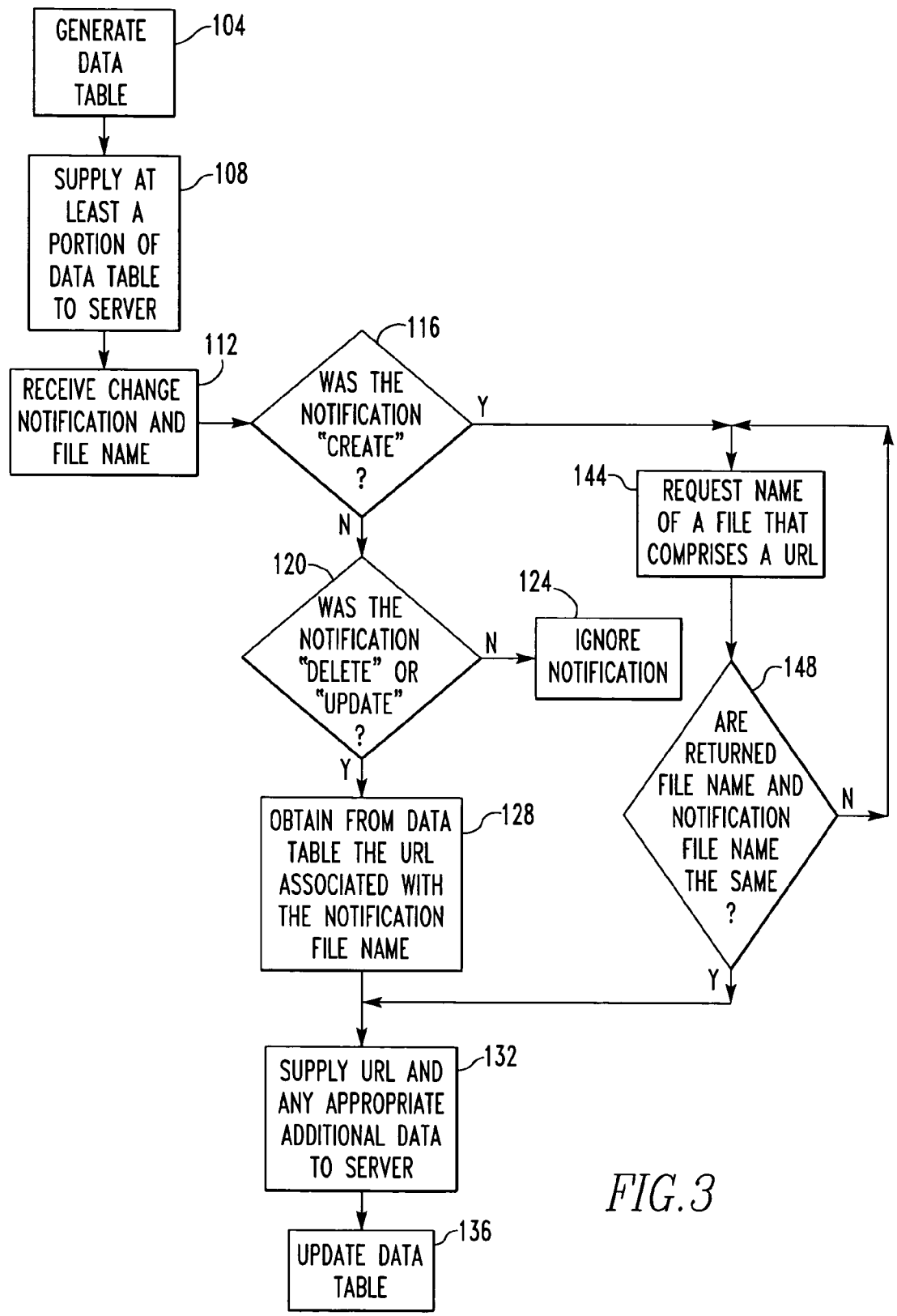
FIG. 3 is an exemplary flowchart of at least a portion of an improved method that can be performed on the improved handheld electronic device of FIG. 1.

FIG. 3 generally depicts an exemplary flowchart depicting certain aspects of the way in which the server 12 is able to have a substantially continuously updated mirror of the browser cache 32 that is stored on the handheld electronic device 4. As indicated above, upon initiation of a browser session by the browser routine 64, the data table 68 is generated, as at 104. At least a portion of the data table 68 is then supplied, as at 108, to the server 12. As indicated above, typically what is supplied to the server 12 is a hash of each URL 48 stored in the second objects 76, along with the corresponding expiry date 52.

The browser routine 64 receives from the API 60 a notification, as at 112, that a certain file 36 has undergone a change. Specifically, the file name 40 of the file 36 that has undergone the change, as well as a notification type are provided to the browser routine 64. As indicated above, the four exemplary types of notifications are CREATE, UPDATE, DELETE, and RENAME.

It is then determined, as at 116, whether the notification was a CREATE notification. If not, it is then determined, as at 120, whether the notification was a DELETE notification or an UPDATE notification. If not, the notification is ignored, as at 124. However, if it was determined at 120 that the notification was either DELETE or UPDATE, the browser routine 64 obtains, as at 128, from the data table 68 the URL 48 that is associated with the received file name 40. More specifically, the data table 68 is consulted to identify the first object 72 which has stored therein a file name 40 that is the same as the received file name 40. The second object 76 associated therewith is consulted to obtain the URL 48 stored therein. The URL 48 and other appropriate data are then supplied, as at 132, to the server 12. The data table 68 is then updated, as at 136, to reflect the change that was notified at 112, assuming that the notification was not ignored at 124.

With more particular regard to the additional data that can be supplied, as at 132, to the server, it is noted that a notification which is a DELETE notification will generally result in supplying to the server 12 a hash of the URL 48 of the deleted file 36, along with a notification that the change was a DELETE. The server 32 will previously have stored in its mirror of the browser cache 32 a hash of the URL 48 in the file 36 that is being deleted. Upon receiving the update transmission, as at 132, the server will delete from its mirror of the browser cache 32 the hash of the URL 48 of the deleted file 36.

However, if the notification received at 112 was an UPDATE notification, updated data such as an updated expiry date 52 typically will be supplied, as at 132, to the server 12.

Such updated data can be obtained in any of a variety of ways. Such updated data can even be obtained from the server 12.

For instance, the browser routine 64 may make a request of the server 12 for a specific HTML document. After receiving the request, the server will obtain, such as from the network 8, the requested HTML document. The obtained HTML document may comprise one or more URLs, and the server 12 may determine from its mirror 12 of the browser cache 32 that the object available at a particular indicated URL is already stored on the handheld electronic device 4 as an object 44 in the browser cache 32. However, the server 12 may also determine that the expiry date 52 of the object 44 has been exceeded, i.e., the object 44 has expired. In this regard, the browser cache 32 may be configured to delete files 36 when the expiry date 52 of the object 44 stored therein has been exceeded. On the other hand, however, the browser cache 32 may be configured such that the file 36 having stored therein an exceeded expiry date 52 is not necessarily deleted, but the object 44 stored therein is updated if requested after expiration of the expiry date 52.

The server 12 might make the determination that the expiry date 52 of the object 44 has been exceeded by first creating a hash of the URL contained within the obtained HTML document. The server 12 will then identifying in its mirror of the browser cache 32 the matching URL hash, and determining whether the expiry date 52 that is associated with the identified matching URL hash has been exceeded.

If the server 12 determines that the expiry date 52 of an object 44 stored in the browser cache 32 has been exceeded, the server 12 may make a new request of the object from the URL. A header of the request may include an instruction to the URL that it provide the object stored at the URL only if the object has changed since being stored in the browser cache 32. If it turns out that the object is not changed, the URL may simply return to the server 12 an updated expiry date.

The updated expiry date will then be transmitted to the handheld electronic device 4, and the operating system 56 will store the received expiry date as an updated expiry date 52 in the corresponding file 40. Such an update will cause the API 60 to generate an UPDATE notification which will be received by the browser routine 64, as at 112. As such, when at 132 the browser routine 64 supplies to the server 12 the URL 48 and appropriate additional data, part of the additional data will be the updated expiry date 52 that has already been stored in the file 36 within the browser cache 32.

If the URL returns to the server 12 a different object than is stored in the browser cache 32, the same URL will likely additionally provide an updated expiry date. The server then would transmit to the handheld electronic device the updated object and updated expiry date, and these would both be saved in the file 36, with the API 60 generating an UPDATE notification at 112, and with the updated expiry date 52 being supplied, as at 132 to the server 12.

If at 116 it is determined that the notification was a CREATE notification, processing continues to 144 where the browser routine 64 requests from the operating system 56 the name of a file 36 that comprises a URL 48 which was the subject of a recent request by the browser routine 64. That is, during a browsing session the browser routine 64 makes a number of browser requests of the server 12. The fact that a particular URL request was made by the browser routine 64 does not indicate whether or not a file 36 having the particular URL stored therein was recently added to the browser cache 32 since it is possible that the object 44 which would otherwise be available at the URL on the network was already stored in the browser cache 32. However, the browser routine 64 maintains a list of recent URL requests. As such, at 144 the browser routine 64 requests of the operating system 56 the name of a file 36 having a particular URL 48 stored therein. The particular URL 48 typically will be the URL that was the subject of the most recent URL request by the browser routine 64.

In response to the request at 144, the operating system 56 may return a file name 40 or may return nothing. It is then determined, as at 148, whether the returned file name 40, if any, and the file name 40 that was generated as part of a notification at 112 are the same. If they are not the same, or if no file name was returned in response to the request at 144 regarding a particular URL, processing returns to 144 where additional requests are made for additional URLs that were the subject of recent URL requests. In this regard, the URLs employed in the requests at 144 typically will be made in reverse chronological order, i.e., the most recent URL will be the subject of the first request at 144, and if the result at 148 is "no", a successive request at 144 will be made with respect to the URL that was next most recently requested by the browser routine 64, and so forth.

In response to one of the requests at 144, the operating system 56 will return a file name 40 that matches the file name 40 that was generated as part of the notification at 112. In such a circumstance, a hash of the URL that was the subject of the successful request is supplied, as at 132, to the server 12. The data table 68 is then updated, as at 136.

As a general matter, the API 60 is capable of generating numerous notifications that may be in excess of what is necessarily or desirably handled by the routines on the handheld electronic device 4. For instance, the API 60 may generate numerous notifications in response to a single event. By way of example, it is noted that an updating operation on the handheld electronic device 4 may generate five separate notifications as follows:

1) the device may create a new file, thus resulting in a CREATE notification;
2) the device may update the new file by writing into the new file the contents of an old file, thus generating an UPDATE notification;
3) the device may append any changes, i.e., edit, the new file, thus resulting in an UPDATE notification;
4) the device may delete the old file, thus resulting in a DELETE notification; and
5) the device may rename the new file to have the name of the old file and to have the attributes of the old file, thus resulting in a RENAME notification.

In essence, the only meaningful change to the browser cache 32 was the updating of the old file, but the way in which the updating occurred resulted in the generation of five notifications, only one of which is particularly meaningful, such as to the browser routine 64. On the other hand, a routine other than the browser routine 64 might find more than one of the five notifications to be useful or relevant.

In accordance with the disclosed and claimed concept, the notifications generated by the API 60 are advantageously subjected to one or more predetermined criteria or algorithms to determine whether or not one or more of the notifications can be ignored. It is noted that the various predetermined criteria, i.e., algorithms, likely will be specific to a given routine on the handheld electronic device 4. That is, what may be an unnecessary or irrelevant notification to one routine might be relevant or desirably noted by another routine.

The browser routine 64 is provided herein as an exemplary routine to which certain notifications generated by the API 60 may desirably be ignored. It is reiterated that certain of the algorithms may be usable in conjunction with other routines than the browser routine 64, and that other algorithms may be unusable with routines other than the browser routine 64. Also, other routines may have other predetermined criteria or algorithms for use in determining whether certain of the notifications can be ignored by the routines.

One of the predetermined criteria, i.e., one algorithm, is to determine whether or not a notification relates to a particular type of file. For instance, a certain routine may find relevant only those notifications that relate to a file having a suffix ".txt". As is mentioned above, the API 60 may generate a number of notifications that each comprise the type of notification, i.e., CREATE, UPDATE, DELETE, or RENAME, as well as the file name 40 of a file 36 that was the subject of the notification. If the particular routine finds relevant only those particular notifications that relate to a ".txt" file, any notification that relates to a file that is of a type other than a ".txt" file will be ignored.

However, a RENAME notification from a file type that the particular routine does not consider relevant into a file name that the routine does consider to be relevant will be ignored and instead treated as a CREATE notification of the file name that the routine considers to be relevant. For instance, a RENAME notification of a file 36 from filename.tmp to filename.txt will be treated as a CREATE notification of filename.txt. Similarly, a RENAME notification from a file type that the particular routine considers to be relevant into a file name that the routine does not consider to be relevant will be ignored and instead treated as a DELETE notification of the file name that the routine considers to be relevant.

It is noted that ignoring a notification can occur in two fashions. In the first fashion, ignoring a notification can simply mean paying no attention to the notification, with no subsequent action. The other fashion of ignoring a notification can occur by paying no attention to the notification that was received, and rather treating the notification as a different notification. The different notification can be of a different type and/or can be as to a different file.

Notifications typically are received from the API 60 as a sequence, i.e., a plurality of notifications are sequentially received from the API 60. The exemplary browser routine 64 may initiate analysis of the notifications, i.e., for the purpose of potentially ignoring certain of the notifications, in response to any of a variety of events. For instance, the browser routine 64 might employ a timer which is reset upon each receipt of a notification. The timer may be set to a particular period of time, i.e., a period of two seconds, or another appropriate time period. If the timer expires without detecting another notification from the API 60, the analysis of the series of notifications may be initiated. On the other hand, notifications may be identified as being in discrete "bunches" which are analyzed together. Other triggering events can be envisioned.

It is noted, however, that an analysis of a relatively greater number of notifications will have a more appropriate result than an analysis of a relatively lesser number of notifications. This is due, at least in part, to the nature of the analysis. As a general matter, each notification is analyzed as being a "current" notification and is analyzed in the context of a "following" notification in the sequence. That is, notifications are analyzed in pairs. In the examples set forth herein, the "following" notification is a sequentially next notification immediately following the "current" notification, but it is noted that the "following" notification could, in appropriate circumstances, be sequentially later than the immediately next notification after the "current" notification.

An exemplary set of criteria, i.e., algorithms, are set forth in the accompanying Table 1 below:

TABLE 1

|  |  | "Following" Notification | | | |
|---|---|---|---|---|---|
|  |  | CREATE file "filename1.txt" | UPDATE file "filename1.txt" | DELETE file "filename1.txt" | RENAME from "filename2.txt" to "filename1.txt" |
| "Current" Notification | CREATE file "filename1.txt" | Ignore the CREATE notification of "filename1.txt" | Ignore the UPDATE notification | Keep both CREATE and DELETE notifications | Keep both CREATE and RENAME notifications |
|  | UPDATE file "filename1.txt" | Ignore the CREATE notification of "filename1.txt" | Ignore the UPDATE notification | Keep both UPDATE and DELETE notifications | Keep both UPDATE and RENAME notifications |
|  | DELETE file "filename1.txt" | If the notification before the DELETE was a CREATE or UPDATE, then, ignore this DELETE and CREATE of "filename1.txt". Otherwise, replace these 2 notifications with an UPDATE notification for "filename1.txt". | Keep both DELETE and UPDATE notifications | Ignore one DELETE notification | Replace these 2 notifications with: DELETE filename2.txt and UPDATE filename1.txt |
|  | RENAME from "filename2.txt" to "filename1.txt" | Keep both RENAME and CREATE notifications | Keep both RENAME and UPDATE notifications | Keep both RENAME and DELETE notifications | Ignore one RENAME notification |

As can be seen from Table 1, if either a CREATE notifications or an UPDATE notification (as a "current" notification) is followed by either a CREATE notification or an UPDATE notification (as a "following" notification) as to the same file, the "following" notification is ignored. For other routines, i.e., other embodiments, the algorithm might be to ignore either the "current" notification or the "following" notification, and to treat the non-ignored notification as an UPDATE notification.

As can further be seen from Table 1, if either a CREATE notification or an UPDATE notification is followed by either a DELETE notification or a RENAME notification that indicates a deletion of the same file or a renaming of another file to the same file, both notifications may be kept, i.e., not ignored. This may be based, at least in part, upon the unlikelihood of detecting from the API 60 such a pair of notifications. Table 1 thus suggests that if such an unlikely pair of notifications is detected, the notifications are not ignored. As an alternative, another routine might choose to ignore both notifications in such a circumstance.

If two sequentially consecutive notifications are precisely the same, i.e., of the same nature and as to the same file, another algorithm might be to ignore one of the two notifications. With other routines, however, possibly neither notification is ignored due to the unlikeliness of receiving such a pair of notifications.

In the circumstance of a DELETE notification followed by a CREATE notification as to the same file, it is determined whether or not the notification that preceded the DELETE notification was either a CREATE notification or an UPDATE notification. If so, the current DELETE and the following CREATE notifications are ignored. However, if the notification preceding the DELETE notification was neither a CREATE nor an UPDATE notification, the current DELETE notification and the following CREATE notification are ignored and are treated as a single UPDATE notification as to the same file. For other routines, the same result can be obtained when the current DELETE notification is followed by an UPDATE notification rather than the aforementioned CREATE notification.

As can further be seen from Table 1, if a DELETE notification as to a particular file is followed by a RENAME notification renaming another file to the name of the particular file, such notifications are replaced with a DELETE notification as to the another file and an UPDATE notification as to the particular file. In effect, the two original notifications are ignored, and are treated as two different notifications. Alternatively, the two notifications could be treated as a DELETE notification as to the another file and a CREATE notification as to the particular file. The two different notifications can then be analyzed in the context of the other notifications in the sequence of notifications being analyzed in order to possibly ignore one or more of these notifications or other notifications in the series.

As can further be seen from Table 1, a RENAME of one file to the name of another file which is followed by a CREATE, an UPDATE, or a DELETE notification as to the another file will result in neither notification being ignored. In other embodiments, however, one or more of such notifications could potentially be ignored, depending upon the needs of the routine.

As an example, a sequence of notifications to be analyzed may be as follows:

| CREATE | filename.tmp |
| UPDATE | filename.tmp |
| UPDATE | filename.tmp |
| UPDATE | filename.tmp |
| UPDATE | filename.txt |
| DELETE | filename.txt |
| RENAME | filename.tmp to filename.txt |
| UPDATE | filename.txt |

As a first step we may ignore the notifications for files of a type about which the browser routine 64 is not concerned. For example, all notifications relating to a file name other than a ".txt" file will be ignored. However, the RENAME notification from filename.tmp to filename.txt will be treated as a CREATE notification of filename.txt. This leaves the following:

| UPDATE | filename.txt |
| DELETE | filename.txt |
| CREATE | filename.txt |
| UPDATE | filename.txt. |

When the first two notifications are considered as a "current" and a "following" notification, Table 1 indicates that an UPDATE notification followed by a DELETE notification as to the same file results in both notifications being kept. If the aforementioned DELETE notification is now considered a "current" notification and is analyzed in the context of the subsequent CREATE notification being a "following" notification, Table 1 indicates that a DELETE notification that is preceded by an UPDATE notification and followed by a CREATE notification as to the same file name, will result in the DELETE and the following CREATE notifications both being ignored.

In the circumstance of a "following" notification being ignored, the next "current" notification to be analyzed will be the most immediately preceding notification that has not yet been ignored. Thus, the first UPDATE notification will again be considered as a "current" notification, and will be considered to be followed by the second UPDATE notification. Table 1 indicates that an UPDATE notification followed by another UPDATE notification as to the same file will result in the second UPDATE notification being ignored.

In the context of the exemplary browser routine 64, therefore, seven of the eight notifications in the exemplary notification sequence above were ignored. As a result, the method indicated for example by the flowchart in FIG. 3 would need to be executed only once, i.e., for the sole remaining UPDATE notification, rather than executing the same routine eight separate times. This advantageously saves executing and power resources.

Figure 4:
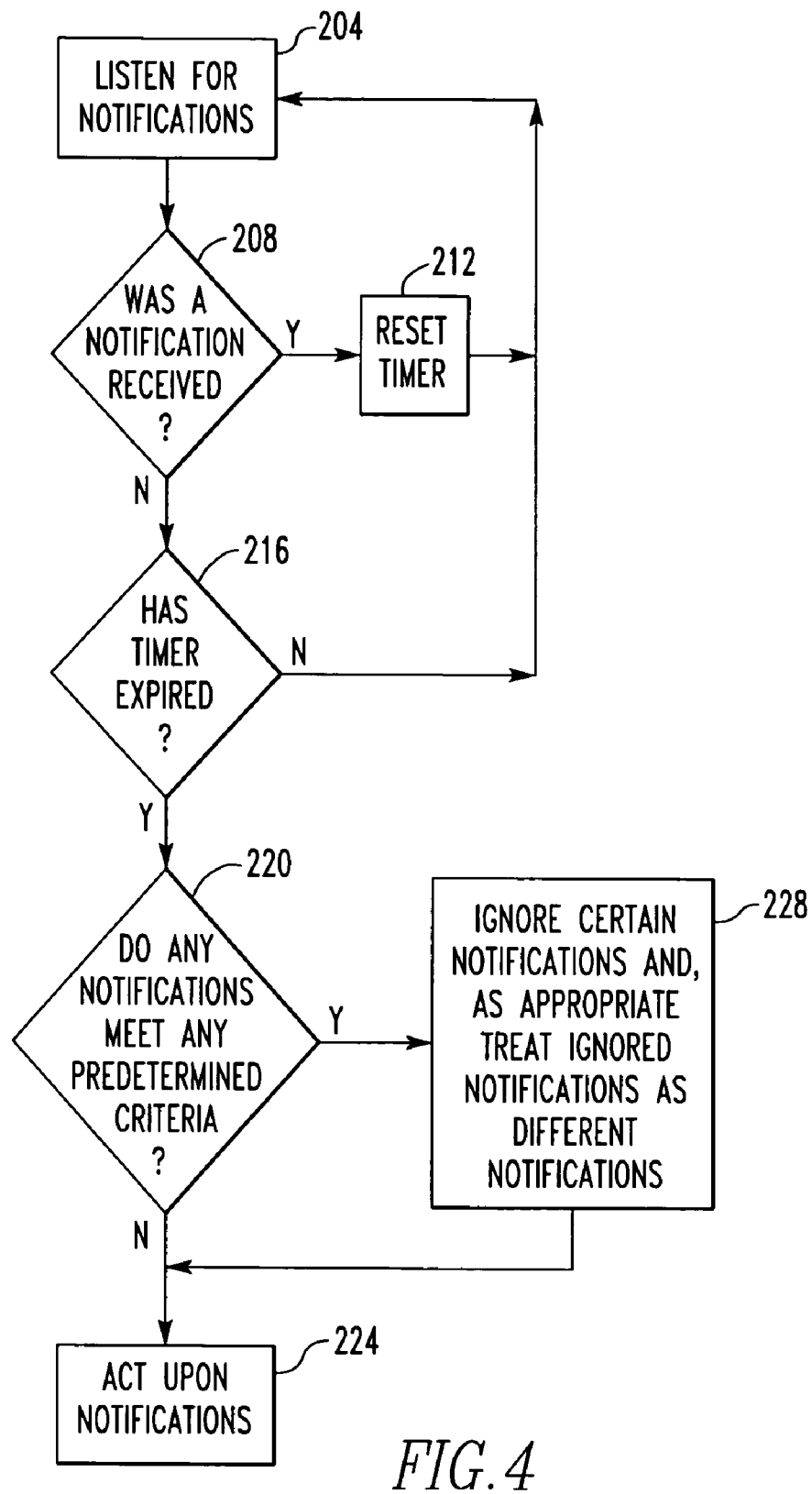
FIG. 4 is an exemplary flowchart of at least a portion of another method that can be performed on the improved handheld electronic device of FIG. 1.

Such a method is depicted generally in the exemplary flowchart of FIG. 4. For instance, the browser routine 64 listens, as at 204, for notifications from the API 60. It is determined, as at 208, whether or not a notification was received. If a notification was received, the timer is reset, as at 212, and processing returns to 204 where the browser routine 64 listens for further notifications. If at 208 it is determined that no notification was received in the preceding listening operation at 204, it is then determined, as at 216, whether or not the timer has expired. If not, processing returns to 204 where further listening occurs.

In this regard, it can be understood that the exemplary steps 204, 208, 212, and 216 form a loop that is repeated at certain intervals, perhaps as often as the processor can execute the loop. Once the timer has expired without having received an additional notification, processing continues to 220 whether it is determined whether or not any of the notifications meet any of the predetermined criteria, i.e., the criteria that are predetermined for the routine performing the listening at 204 or for which the notifications are being detected. If no notifications meet the predetermined criteria, the notifications are acted upon, as at 224. Such notifications may be acted upon by being stored, by initiating other processing, or in other fashions.

If, however, at 220 it is determined that some of the notifications meet one or more of the predetermined criteria, processing continues at 228 where certain of the notifications are ignored and, as appropriate, may be treated as being different notifications. Processing thereafter continues at 224 where the remaining notifications are acted upon.

With further regard to the operations at 220, it is understood that any of a variety of criteria, i.e., algorithms, can be employed depending upon the needs of the particular routine in question. As such, algorithms in addition to those set forth herein can be employed without departing from the present concept.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of processing notifications provided by an application programming interface of a handheld electronic device, said notifications being generated by said application programming interface in response to one or more changes being made in a memory of said handheld electronic device, the method comprising:
   at each routine of a plurality of routines of said handheld electronic device, each of said plurality of routines being separate from said application programming interface;
      receiving said notifications;
      based on time of receipt of each notification, identifying a series of notifications so that each notification of said series is separated in time from at least one other notification of said series by less than a given time interval and such that all notifications which are not part of said series of notifications are separated in time from said each notification of said series by more than said given time interval;
      analyzing a pair of the notifications of said series of notifications together, said pair of the notifications comprising a first notification and a second notification, said second notification being subsequent in time to said first notification, said analyzing including analyzing said first notification in a context of said second notification by subjecting said first notification and said second notification to one or more criteria specific to one or more of said plurality of routines; and
      responsive to said analyzing, ignoring one of the first notification and the second notification, wherein the ignoring the first notification comprises either paying no attention to the first notification or treating said first notification as a first different notification, and wherein the ignoring the second notification comprises either paying no attention to the second notification or treating said second notification as a second different notification.

2. The method of claim 1, said analyzing including making as at least a part of the analyzing one of:
   a determination that at least one of the first notification and the second notification is of a predetermined type; and
   a determination that at least one of the first notification and the second notification is not of a predetermined type.

3. The method of claim 2, said analyzing including at least one of:
   making as the determination that at least one of the first notification and the second notification is of a predetermined type a determination that one of the first notification and the second notification refers to a file that is of a predetermined type; and
   making as the determination that at least one of the first notification and the second notification is not of a predetermined type a determination that one of the first notification and the second notification refers to a file that is not of a predetermined type.

4. The method of claim 1, said analyzing including making as at least a portion of the analyzing a determination that at least one of the first notification and the second notification is a notification of a renaming of a file that is not of a predetermined type into a file that is of a predetermined type and, responsive thereto, treating the one of the first notification and the second notification as a notification of a creation of the file that is of the predetermined type.

5. The method of claim 1, said analyzing including making as at least a portion of the analyzing a determination that at least one of the first notification and the second notification is a notification of a renaming of a file that is of a predetermined type into a file that is not of a predetermined type and, responsive thereto, treating the one of the first notification and the second notification as a notification of a deletion of the file that is of the predetermined type.

6. The method of claim 1, further comprising, at said each routine, determining that a predetermined period of time has expired since a reception of said second notification without reception of a subsequent notification and, responsive thereto, initiating said analyzing.

7. The method of claim 1, further comprising employing as one of the criteria a determination that a particular notification and an immediately subsequent notification are the same notification.

8. The method of claim 1, further comprising employing as one of the criteria a determination that:
   a particular notification is one of two types of notifications and is with respect to a specific file, and
   a subsequent notification is one of the two types of notifications and is with respect to the specific file.

9. The method of claim 8, further comprising employing as the two types of notifications a CREATE notification and an UPDATE notification.

10. The method of claim 1 further comprising, at said each routine:
    acting upon said first notification if said first notification is not ignored, acting upon said first different notification if said first notification is ignored and treated as said first different notification, acting upon said second notification if said second notification is not ignored, and acting upon said second different notification if said second notification is ignored and treated as said second different notification.

11. The method of claim 1 wherein said identifying a series of notifications comprises:
    (a) where no notification has yet been identified for said series of notifications, on receipt of a notification, selecting said notification as a first notification for said series of notifications;
    (b) beginning timing of said given time interval with a timer;
    (c) if a further notification is received before an end of said given interval, selecting said further notification as part of said series of notifications, resetting said timer, and beginning timing of another said given time interval; and
    (d) repeating (c) until no notification is received prior to expiration of said timer.

12. The method of claim 1 further comprising, at said each routine:
  responsive to said analyzing, ignoring the other of the first notification and the second notification.

13. The method of claim 12, said analyzing including:
  making as at least a portion of the analyzing a determination that:
    the first notification is a DELETE notification as to one file;
    the second notification is a RENAME notification as to the renaming of another file from its name to the name of the one file;
  the method including treating the DELETE notification and the RENAME notification as being a DELETE notification as to the another file and an UPDATE notification as to the one file.

14. A handheld electronic device comprising an input apparatus, a processor apparatus, and an output apparatus, the processor apparatus comprising a processor and a memory, the memory further having stored therein an application programming interface and a plurality of routines, each of said plurality of routines being separate from said application programming interface, wherein each routine of said plurality of routines when executed on the processor, cause the handheld electronic device to be adapted to perform operations comprising:
  receiving notifications generated by said application programming interface in response to one or more changes being made in said memory;
  based on time of receipt of each notification, identifying a series of notifications so that each notification of said series is separated in time from at least one other notification of said series by less than a given time interval and such that all notifications which are not part of said series of notifications are separated in time from said each notification of said series by more than said given time interval;
  analyzing a pair of the notifications of said series of notifications together, said pair of the notifications comprising a first notification and a second notification, said second notification being subsequent in time to said first notification, said analyzing including analyzing said first notification in a context of said second notification by subjecting said first notification and said second notification to one or more criteria specific to one or more of said plurality of routines; and
  responsive to said analyzing, ignoring one of the first notification and the second notification, wherein the ignoring the first notification comprises either paying no attention to the first notification or treating said first notification as a first different notification, and wherein the ignoring the second notification comprises either paying no attention to the second notification or treating said second notification as a second different notification.

15. The handheld electronic device of claim 14, said analyzing including making as at least a part of the analyzing one of:
  a determination that at least one of the first notification and the second notification is of a predetermined type; and
  a determination that at least one of the first notification and the second notification is not of a predetermined type.

16. The handheld electronic device of claim 15, said analyzing including at least one of:
  making as the determination that at least one of the first notification and the second notification is of a predetermined type a determination that one of the first notification and the second notification refers to a file that is of &predetermined type; and
  making as the determination that at least one of the first notification and the second notification is not of a predetermined type a determination that one of the first notification and the second notification refers to a file that is not of a predetermined type.

17. The handheld electronic device of claim 14 said analyzing including making as at least a portion of the analyzing a determination that at least one of the first notification and the second notification is a notification of a renaming of a file that is not of a predetermined type into a file that is of a predetermined type and, responsive thereto, treating the one of the first notification and the second notification as a notification of a creation of the file that is of the predetermined type.

18. The handheld electronic device of claim 14 said analyzing including making as at least a portion of the analyzing a determination that at least one of the first notification and the second notification is a notification of a renaming of a file that is of a predetermined type into a file that is not of a predetermined type and, responsive thereto, treating one of the first notification and the following notification as a notification of a deletion of the file that is of the predetermined type.

19. The handheld electronic device of claim 14 wherein the operations further comprise determining that a predetermined period of time has expired since a reception of said following notification without reception of a subsequent notification and, responsive thereto, initiating said analyzing.

20. The handheld electronic device of claim 14 wherein the operations further comprise employing as one of the criteria a determination that a particular notification and an immediately subsequent notification are the same notification.

21. The handheld electronic device of claim 14 wherein the operations further comprise employing as one of the criteria a determination that:
  a particular notification is one of two types of notifications and is with respect to a specific file; and
  a subsequent notification is one of the two types of notifications and is with respect to the specific file.

22. The handheld electronic device of claim 21 wherein the operations further comprise employing as the two types of notifications a CREATE notification and an UPDATE notification.

23. The handheld electronic device of claim 14 wherein the operations further comprise acting upon said first notification if said first notification is not ignored, acting upon said first different notification if said first notification is ignored and treated as said first different notification, acting upon said second notification if said second is not ignored, and acting upon said second different notification if said second notification is ignored and treated as said second different notification.

24. The handheld electronic device of claim 14 wherein the operations further comprise:
  (a) where no notification has yet been identified for said series of notifications, on receipt of a notification, selecting said notification as a first notification for said series of notifications;
  (b) beginning timing of said given time interval with a timer;
  (c) if a further notification is received before an end of said given interval, selecting said further notification as part of said series of notifications, resetting said timer, and beginning timing of another said given time interval; and
  (d) repeating (c) until no notification is received prior to expiration of said timer.

25. The handheld electronic device of claim 14 wherein said operations further comprise:
responsive to said analyzing, ignoring the other of the first notification and the second notification.

26. The handheld electronic device of claim 25 said analyzing including:
making as at least a portion of the analyzing a determination that:
the first notification is a DELETE notification as to one file;
the second notification is a RENAME notification as to the renaming of another file from its name to the name of the one file;
the method including treating the DELETE notification and the RENAME notification as being a DELETE notification as to the another file and an UPDATE notification as to the one file.

27. A method of processing notifications provided by an application programming interface of a handheld electronic device, said notifications being generated by said application programming interface in response to one or more changes being made in a memory of said handheld electronic device, the method comprising:
at each routine of a plurality of routines of said handheld electronic device, each of said plurality of routines being separate from said application programming interface:
receiving a series of notifications;
based on time of receipt of each notification, identifying a series of notifications so that each notification of said series is separated in time from at least one other notification of said series by less than a given time interval and such that all notifications which are not part of said series of notifications are separated in time from said each notification of said series by more than said given time interval;
for each of a plurality of pairs of notifications of said series of notifications,
selecting a first notification and a second notification from said series of notifications as a selected pair of the notifications, said second notification being subsequent in time to said first notification;
processing said first notification of said selected pair in a context of said second notification of said selected pair by subjecting said first notification and said second notification to one or more criteria specific to one or more of said plurality of routines to selectively, ignore said first notification or retain said first notification as a processed first notification wherein said processed first notification is either unaltered or treated as a different notification, and to selectively ignore said second notification or retain said second notification as a processed second notification wherein said processed second notification is either unaltered or treated as a different notification;
wherein said selecting comprises, after processing a given selected pair of notifications, (i) if said first notification of said given selected pair is ignored and said second notification is retained, selecting said processed second notification as said first notification for a next selected pair of notifications, and (ii) if said second notification is ignored and said first notification is retained, selecting said processed first notification of said given selected pair as said first notification for said next selected pair.

28. The method of claim 27 further comprising, at said each routine:
acting upon any said processed first notification and acting upon any said processed second notification.

29. The method of claim 28 wherein said processing comprises:
a determination that at least one of the first notification and the second notification is of a predetermined type; and
a determination that at least one of the first notification and the second notification is not of a predetermined type.

30. The method of claim 28 wherein said processing further comprises at least one of:
making as the determination that at least one of the first notification and the second notification is of a predetermined type a determination that one of the first notification and the second notification refers to a file that is of a predetermined type; and
making as the determination that at least one of the first notification and the second notification is not of a predetermined type a determination that one of the first notification and the second notification refers to a file that is not of a predetermined type.

31. The method of claim 28 wherein said processing comprises determining that at least one of the first notification and the second notification is a notification of a renaming of a file that is not of a predetermined type into a file that is of a predetermined type and, responsive thereto, treating the one of the first notification and the second notification as a notification of a creation of the file that is of the predetermined type.

32. The method of claim 28 wherein said processing comprises determining that at least one of the first notification and the second notification is a notification of a renaming of a file that is of a predetermined type into a file that is not of a predetermined type and, responsive thereto, treating the one of the first notification and the second notification as a notification of a deletion of the file that is of the predetermined type.

33. The method of claim 28, said processing including determining that:
the first notification is a DELETE notification as to one file;
the second notification is a RENAME notification as to the renaming of another file from its name to the name of the one file; and
treating the DELETE notification and the RENAME notification as being a DELETE notification as to the another file and an UPDATE notification as to the one file.

* * * * *

UNITED STATES PATENT AND TRADEMARK OFFICE
CERTIFICATE OF CORRECTION

PATENT NO. : 8,146,101 B2  
APPLICATION NO. : 11/414710  
DATED : March 27, 2012  
INVENTOR(S) : Alvin Yulo Page 1 of 1

It is certified that error appears in the above-identified patent and that said Letters Patent is hereby corrected as shown below:

IN THE CLAIMS:

Column 11, in claim 1, line 29, "programming interface;" should be changed to -- programming interface: --; and Column 14, in claim 16, line 3, "& predetermined type" should be changed to -- a predetermined type --.

Signed and Sealed this  
Fourth Day of December, 2012

David J. Kappos  
*Director of the United States Patent and Trademark Office*